United States Patent [19]

Lower et al.

[11] 4,441,330
[45] Apr. 10, 1984

[54] REFRIGERANT RECOVERY AND RECHARGING SYSTEM

[75] Inventors: Ralph C. Lower, Bryan; Roger D. Shirley, West Unity, both of Ohio

[73] Assignee: Robinair Manufacturing Corporation, Montpelier, Ohio

[21] Appl. No.: 402,856

[22] Filed: Jul. 29, 1982

Related U.S. Application Data

[62] Division of Ser. No. 211,571, Dec. 1, 1980, Pat. No. 4,364,236.

[51] Int. Cl.³ .............................................. F25B 45/00
[52] U.S. Cl. ......................................... 62/149; 62/292
[58] Field of Search ...................... 62/292, 77, 474, 84, 62/475, 149

[56] References Cited

U.S. PATENT DOCUMENTS

| | | | |
|---|---|---|---|
| 2,893,217 | 7/1959 | Nigro | 62/126 |
| 3,232,070 | 2/1966 | Sparano | 62/292 X |
| 3,400,552 | 9/1968 | Johnson et al. | 62/292 X |
| 3,538,961 | 11/1970 | Bruce | 62/292 |
| 3,695,055 | 7/1970 | Bruce | 62/292 X |
| 3,699,781 | 10/1972 | Taylor | 62/85 X |
| 3,826,104 | 7/1974 | Lamb | 62/292 X |
| 3,873,289 | 3/1975 | White | 62/292 X |
| 3,974,659 | 8/1976 | Edwards | 62/84 |
| 4,285,206 | 8/1981 | Koser | 62/292 |

Primary Examiner—William E. Wayner
Attorney, Agent, or Firm—Beaman & Beaman

[57] ABSTRACT

The invention pertains to method and apparatus for servicing refrigeration circuits wherein the refrigerant is removed from the circuit and the circuit recharged. In accord with the invention the recovered refrigerant may be reprocessed for recharging the circuit, or the recovered refrigerant may be stored and fresh refrigerant employed for circuit charging purposes. Further, the invention contemplates the removal of oil from recovered refrigerant, and the charging of a predetermined amount of lubricating oil into the recharged circuit.

10 Claims, 3 Drawing Figures

REFRIGERANT RECOVERY AND RECHARGING SYSTEM

This is a divisional application of Application Ser. No. 06/211,571 filed Dec. 1, 1980, now U.S. Pat. No. 4,364,236.

BACKGROUND OF THE INVENTION

To service a refrigeration circuit, such as used for food refrigeration, air conditioning, and assorted cooling purposes wherein a refrigerant is compressed, expanded, and condensed it is usually required to remove the refrigerant. Further, refrigerant can become contaminated by foreign matter within the refrigeration circuit, or by condensing moisture, and while oil is commonly mixed with the refrigerant for lubrication purposes the ratio of refrigerant to oil may adversely change over a period of time and it is often desirable to change the refrigerant to improve the operation efficiency.

When servicing a refrigeration circuit it has been the practice for the refrigerant to be vented into the atmosphere, the apparatus serviced and repaired, the circuit is then evacuated by a vacuum pump, and recharged with refrigerant. This procedure has now become unacceptable for environmental reasons in that the discharge of refrigerant into the atmosphere is now considered to produce serious contamination. Also, the cost of refrigerant is now becoming an important factor with respect to service costs, and such a waste of refrigerant, which could be reprocessed, is no longer acceptable.

In view of the adverse environmental impact of venting refrigerant into the atmosphere refrigerant recovery and evacuation systems have been devised to overcome such problems wherein the recovered refrigerant is stored for disposal. Such a system is shown in the assignee's U.S. Pat. No. 4,261,178.

Further, a system has been proposed for the servicing of refrigeration circuits wherein the refrigerant may be removed from the circuit and stored, and the circuit recharged with fresh refrigerant, such system using common components, as disclosed in U.S. Pat. No. 4,363,222 assigned to the assignee.

When servicing refrigeration circuits utilizing compressors the refrigerant includes lubricating oil, and upon evacuating the circuit lubricating oil will be removed. Heretofore, it has not been possible to accurately determine the extent of such oil loss during servicing, and it is possible that the previous haphazard procedures for servicing compressor type refrigeration circuits may result in either too much or too little oil within the circuit resulting in compressor damage or inefficiency of operation. Previously, refrigerant evacuation and charging systems have not been capable of closely monitoring lubricating oil removal and recharging.

It is an object of the invention to provide a fully portable refrigeration circuit refrigerant recovery and recharging system which is suitable for servicing refrigeration circuits on site, such as automobile air conditioning systems, wherein the refrigerant is removed from the circuit, and wherein recharging is accomplished, the various cycles and sequences of operation being automatically accomplished by a electronic control.

Another object of the invention is to provide a refrigerant recovery and charging system wherein lubricating oil is separated from the recovered refrigerant, and during recharging a predetermined amount of oil is injected into the refrigeration circuit.

A further object of the invention is to provide a refrigerant recovery and charging system wherein the recovered refrigerant is filtered and purified on site and utilized to recharge the refrigeration circuit from which it has been withdrawn.

Yet another object of the invention is to provide a refrigerant recovery and recharging system whose operation and cycling is automatically controlled through a microprocessor and wherein recovered refrigerant is processed, purified and utilized to recharge the circuit, and wherein fresh refrigerant may be added to the reprocessed refrigerant to make up for any difference between the amount of reprocessed refrigerant available and that required to properly charge the circuit.

In the practice of the invention a manifold conduit system communicates with the high and low sides of the refrigeration circuit to be serviced. A recovery compressor or pump withdraws refrigerant from the circuit through a filter, evaporator and oil separator. The refrigerant, in liquid form, is stored within a reservoir or receiver, and the receiver may constitute a disposal container, but preferably, constitutes a reservoir communicating with a metering pump which has an outlet in selective communication with a refrigerant purifier whereby the liquid refrigerant may be removed from the reservoir and passed through the purifier. It is possible to cycle the refrigerant through the purifier to produce a refined, clean refrigerant, and upon valve operation the metering pump will draw refrigerant from the purifier and its associated circuit for charging into the manifold conduit system and the refrigeration circuit. A supply of fresh refrigerant selectively communicates with the metering pump to make up any lack of refrigerant existing in the purifier circuit, and the metering pump assures that the refrigeration circuit is fully charged.

Further, metered oil injection means communicate with the manifold conduit system whereby, during recharging, a predetermined amount of lubricating oil may be introduced into the refrigeration circuit. The oil separator is capable of determining the amount of oil removed from the recovered refrigerant, and the amount of oil injected into the manifold conduit for recharging purposes is determined by the amount of oil removed during recovery.

As the system of the invention utilizes a plurality of components which are interconnected by conduits and electrically operated valves the circuit utilizes pressure switches and other known control instruments which supply information to a preprogrammed microprocessor control wherein the various cycles and sequences of operation may be automatically controlled, and will be indicated to the operator. The automatic controls inform the operator through a display the various stages of operation occurring, or required, and the electronic control substantially eliminates human error with respect to sequence of system operation.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
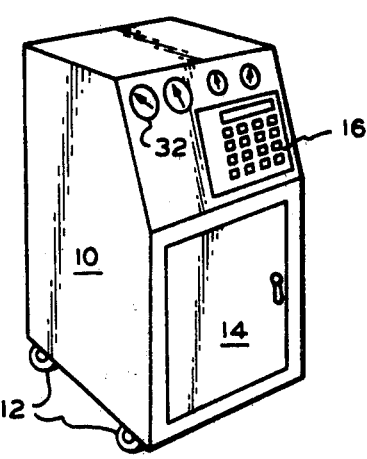
FIG. 1 is an elevational, perspective view of refrigerant recovery and charging system apparatus in accord with the invention as mounted within a portable housing.

The refrigerant recovery and recharging system of the invention is intended for use at the site of the refrigeration circuit being processed, and can be used with a variety of refrigeration circuits, including automotive air conditioning systems. In the preferred commercial form the components are housed within a cabinet 10, FIG. 1, which is mounted upon wheels 12, and the cabinet includes a front access door 14, and at the rear, not shown, a plurality of hose lines and hose connections are available for attachment to the circuit being serviced. The cabinet control panel includes a plurality of gauges and an electronic microprocessor unit indicated at 16 provides automatic control of the system and includes a LED display 18 and push button switches 20 for feeding the desired information into the unit. The microprocessor 16 is preprogrammed and the control buttons 20 feed information into the unit, initiate various cycles, permit the operation to be suspended or terminated, and provide a high degree of operator controlled versatility, if desired.

Figure 2:
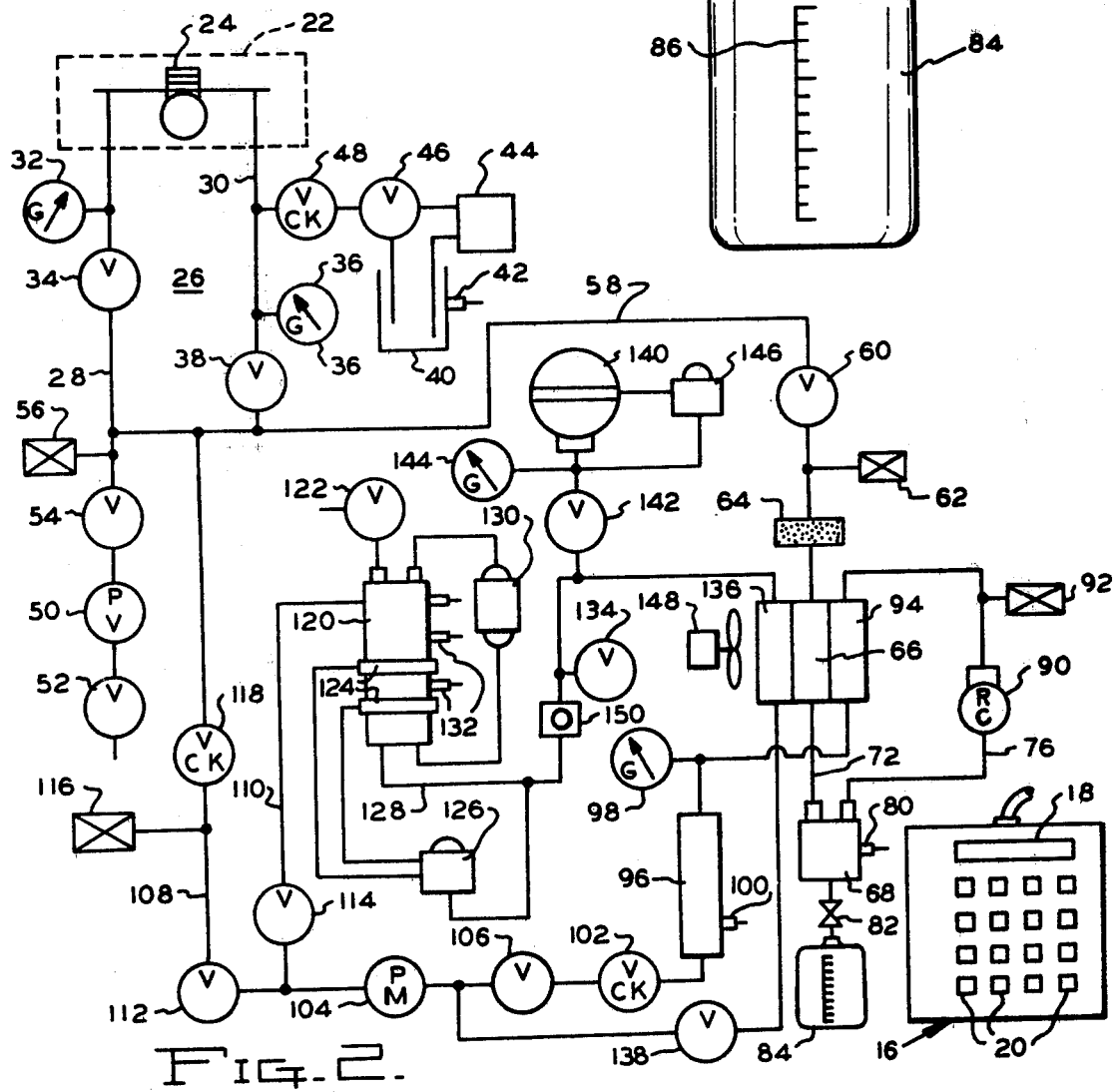
FIG. 2 is a schematic view of the circuit of the invention.

The preferred circuit of the invention is illustrated in FIG. 2, and in this circuit the refrigeration circuit being serviced is generally indicated at 22. This circuit includes a compressor 24 having inlet and outlet conduits associated therewith representing low and high sides of the circuit.

The system includes a manifold conduit 26 including a portion 28 communicating with the refrigeration circuit low side, and a portion 30 communicating with the circuit high side. Pressure gauge 32 communicates with portion 28 and a solenoid operated valve 34 is included in the portion 28. Manifold conduit 26, in the high side portion 30, includes a pressure gauge 36, and solenoid operated valve 38.

Oil injection apparatus communicates with manifold conduit portion 30 and includes an oil reservoir 40 having a liquid level sensor 42 associated therewith. A metering pump 44 has an inlet communicating with the reservoir 40 and the pump outlet communicates with three way solenoid operated valve 46 wherein oil may be bypassed to the reservoir, or introduced through the check valve 48 into conduit portion 30 for recharging the refrigeration circuit with lubricating oil, as later described.

A vacuum pump system communicates with the manifold conduit 26 and includes a vacuum pump 50 having a solenoid operated gas ballast valve 52. The pump inlet communicates with solenoid operated valve 54 and the pressure between valve 54 and the manifold conduit is sensed by pressure switch 56.

A conduit 58 communicates with the manifold conduit and is valved by solenoid operated valve 60 and includes the low pressure cut out switch 62. A particulate filter 64 filters all of the refrigerant being drawn through conduit 58, and the filter communicates with an evaporator coil 66 which discharges into the oil separator 68.

Figure 3:
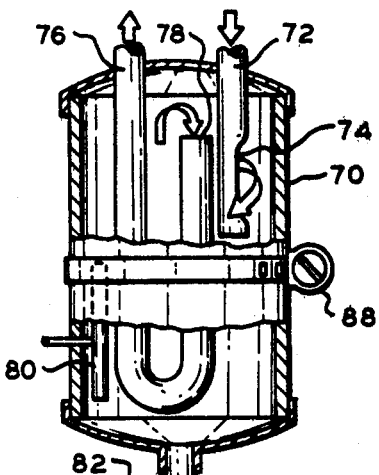
FIG. 3 is an elevational view, partially in section, illustrating a type of oil separator which may be employed with the invention.

The oil separator 68 is shown in greater detail in FIG. 3, and includes a casing 70 for receiving the combined refrigerant and oil withdrawn from circuit 22. The inlet conduit 72 includes a side discharge port 74 for releasing the refrigerant and oil into the casing to produce a turbulence along the inside of the casing wherein the oil will be separated from the refrigerant and be contained within the casing. A U shaped outlet conduit 76 having an inlet port 78 defined adjacent the upper region of the casing receives the refrigerant, free of oil, for discharge through conduit 76. The casing 70 preferably contains an oil level sensing device 80, which may be of an optical type, capable of producing an electronic signal proportional to the amount of oil within the casing, and the casing is drained through valve 82 into an oil collector 84 which includes indicia graduations 86 whereby the amount of oil removed from the refrigerant may be visually observed. A heating element 88 may be clamped to the side of the casing 70 to control the temperature thereof.

The removal of the refrigerant from the circuit 22 is produced by the recovery compressor 90 whose inlet communicates with conduit 76, and the compressor discharge communicates with a high pressure cut out switch 92 prior to the refrigerant entering the condenser 94.

The refrigerant discharge from the condenser 94 is in the form of a liquid and passes into a reservoir or receiver 96 and the pressure at this point is sensed by gauge 98. The reservoir includes a low liquid level sensor 100, and the reservoir discharge passes through check valve 102 for selective communication with the inlet of metering pump 104 through solenoid valve 106.

The outlet of the metering pump 104 communicates with conduits 108 and 110 through solenoid operated valves 112 and 114, respectively. Conduit 108 communicates with the high pressure cut out switch 116 and the manifold conduit 26 through check valve 118, while conduit 110 communicates with the refrigerant purifier 120.

The refrigerant purifier 120 constitutes a vessel capable of retaining a significant amount of refrigerant, and the housing includes purifying apparatus for cleaning, drying and reprocessing the refrigerant introduced therein. The particular type of purifying and processing apparatus within the purifier does not constitute a part of this invention, and known refrigerant processing apparatus may be employed, such as molecular sieve filters of activated alumina.

The purifier 120 includes a solenoid operated venting valve 122, and heaters 124 heat the refrigerant within the purifier through control 126 which senses the temperature of the refrigerant passing through the purifier outlet conduit 128. The heaters 124 will thereby provide the desired above ambient refrigerant temperature under automatic control.

The purifier 120 includes air purge control apparatus 130, and three electrical liquid level sensors 132 are vertically spaced upon the purifier for sensing the level of refrigerant therein.

The purifier outlet conduit 128 is valved by solenoid valve 134, and the valve 134 communicates with subcooler 136. The subcooler 136 communicates through a conduit with solenoid operated valve 138 which communicates with the inlet of the metering pump 104.

In the event that the refrigerant withdrawn from the circuit 22 is not sufficient to fully recharge the circuit, after processing, a bulk refrigerant container 140 containing fresh refrigerant communicates with conduit 128 through solenoid operated valve 142. The pressure within the container 140 is indicated by gauge 144, and a heater and heater control 146 maintains the desired temperature of the container.

As will be appreciated from FIG. 2, the heat exchangers constituting the evaporator 66, condenser 94 and subcooler 136 are mounted adjacent each other whereby the electric air circulating fan 148 passes air over these three heat exchangers to increase the efficiency thereof. This concise arrangement produces high efficiency in a small space.

The operation of the apparatus of the invention is described below:

Initially, the manifold conduit 26 is attached to the high and low sides of the refrigeration circuit 22 by hoses and conventional coupling means usually present with refrigeration circuits for servicing purposes. Upon such coupling, the apparatus of the invention will be properly connected to the refrigeration circuit to be serviced and the cycles described below may be initiated.

To evacuate the "old" refrigerant from the circuit the valves 34 and 38 are opened establishing communication between the manifold conduit 26 and the circuit 22. The operation of the recovery compressor 90 will draw refrigerant through the open valve 60 and the refrigerant will pass through the particulate filter 64 wherein particulate matter from the system is filtered from the refrigerant. However, the filter 64 does not remove oil from the refrigerant.

From the filter 64 the refrigerant passes through the evaporator 66 where the refrigerant is changed into a gas. This gasifying assures that no liquid refrigerant is allowed to enter the recovery compressor and possibly damage the same.

The refrigerant leaving the evaporator enters the oil separator 68 where the oil from the circuit is captured, and later measured, and the refrigerant gas, substantially free of oil, passes from the oil separator through conduit 76 into the recovery compressor 90.

The gaseous refrigerant leaves the compressor 90 and enters the condenser 94 where it is liquified prior to being received within reservoir 96. The liquid refrigerant is stored within reservoir 96 until needed to raise the liquid level in the purifier 120. When the liquid level within the purifier 120 reaches a predetermined position as sensed by one of the sensors 132 the valve 106 is opened and metering pump 104 supplies refrigerant from reservoir 96 through valve 114 into the purifier. If the liquid level sensor 100 associated with the reservoir 96 senses a low level of refrigerant within the reservoir the valves 106 and 134 are closed, and valve 142 is opened to permit refrigerant to be supplied to valve 138 from the fresh refrigerant supply container 140. This allows new or make up refrigerant to be pumped through the metering pump 104 into the purifier 120, and the amount of refrigerant so supplied is controlled by one of the purifier liquid level sensors 132.

The aforedescribed processing and sequence is that preferred. However, it is to be understood that it is within the inventive concept to store all of the recovered refrigerant within a removable container which would be substituted for reservoir 96. In such instance all new refrigerant would be used for recharging circuit 22, and the amount of refrigerant within the reservoir substituted for reservoir 96 can be sensed by weight sensing means in the manner described in the assignee's U.S. Pat. No. 4,363,222.

If the system of the invention is to use only new refrigerant for recharging, and purification of old refrigerant does not take place, the recharging of the circuit 22 with new refrigerant will occur through valve 142, valve 138, the metering pump 104, and valve 112 in a manner which will be apparent from the above description, and as similar to the recharging concepts described in the assignee's U.S. Pat. No. 4,363,222.

When the purifier 120 is low on refrigerant the appropriate liquid level sensor 132 causes valve 106 to open allowing refrigerant from reservoir 96 to enter the purifier through metering pump 104, and all of the valves will be closed except valves 106 and 114. Upon the proper amount of refrigerant being located within purifier 120, valves 114, 134 and 138 will be opened, all of the other valves will be closed, and energizing of the spur gear metering pump 104 will circulate refrigerant through the purifier and subcooler 136 to increasingly process and clean the refrigerant within the purifier. The purifier outlet conduit 128 includes moisture indicating means 150 for sensing the amount of moisture within the refrigerant as it is important that the refrigerant be dry and clean prior to recharging the refrigeration circuit 22.

The purificiation recycling mode described above can operate during other functions of the system with the exception of the refrigerant recharging mode, and thus, purification of the refrigerant can occur during circuit evacuation or discharging.

The refrigeration circuit 22 must be evacuated of air and moisture prior to recharging with refrigerant, and evacuation is produced by the vacuum pump 50. When the vacuum pump 50 is operating the valve 54 is opened and valve 60 is closed. The vacuum pump is operated until a predetermined vacuum level is achieved as indicated by switch 56, or a manual override switch may be used to determine the length of the vacuum pump operation.

The vacuum pump is preferably equipped with an automatic gas ballast. The solenoid valve 52 will be energized for a predetermined duration each time the vacuum pump is energized to permit the vacuum pump oil to be cleaned of any contaminants to assure efficient operation.

Once the refrigeration circuit 22 has been evacuated valve 54 is closed and valves 134, 138 and 112 are opened whereby the metering pump 104 will pull clean refrigerant from the purifier 120 and force the same into the manifold conduit 26 and circuit 22. The subcooler 136 lowers the temperature of the refrigerant approximately 2° Fahrenheit, but keeps the pressure of the refrigerant at the required level. During recharging valve 34 is closed, and valve 38 opened so that recharging occurs at the high side of the circuit 22. Recharging continues until the desired amount of refrigerant has been charged into the circuit as determined by the operation of the metering pump 104. Upon recharging being completed the metering pump operation terminates and valve 38 is closed.

Lubricating oil is recharged into the circuit 22 by means of the oil injection pump 44. Thus, upon the amount of oil removed from the evacuated refrigerant by oil separator 68 being determined, the oil pump 44 is energized to insert a commensurate amount of oil into the refrigeration circuit. Usually, the amount of oil injected into the circuit 22 is equal to the oil removed as determined by sensor 80, or collector 84. Thus, the amount of oil to be injected into the circuit can be automatically or manually determined and controlled.

The solenoid valve 122 associated with the purifier 120 is part of the air purge control, and upon a higher pressure being sensed by the control 130 than what the corresponding temperature should require, the control 130 will energize valve 122 and allow the noncondensable gases to escape from the purifier.

The gauge 32 constitutes a compound gauge indicating both pressure and vacuum, while the gauge 36 is a pressure gauge sensing the pressure on the high side of the circuit. The gauge 144 monitors the pressure within the refrigerant supply container 140, and the pressure gauge 98 monitors the discharge pressure of the recovery compressor.

The pressure switch 56 is used to terminate operation of the vacuum pump 50 when a predetermined vacuum has been reached. The low pressure cut out switch 62 is used to terminate operation of the recovery compressor when a predetermined vacuum has been reached during recovery of the refrigerant. This control switch indicates to the control system that all of the refrigerant has been removed from the circuit.

The high pressure cut out switch 92 senses the recovery compressor discharge pressure and is employed as a safety device in the event that the discharge pressure becomes excessive. The high pressure switch 116 is employed as a safety device for terminating the operation of the metering pump in the event that a valve is closed on the outlet side of the pump, which should have opened.

Many of the components of the described system are commercially available. For instance, the recovery compressor 90 is manufactured by Tecumseh Products Model CD, the metering pump 104 is produced by Houdaille Industries, Viking Model 0.15 gal/min., the purifier 120 is produced by Sporlan Valve Co., Model C 30013 and the same company produces filter 64, Model C 487. While pumps 44 and 104 are time controlled, other conventional metering techniques or apparatus could be used to regulate the amount of liquid being pumped thereby.

The electronic control of the system as produced by microprocessor 16 is programmed to permit the entire cycle of operation to automatically occur, if desired. For instance, the sequential steps of removing the refrigerant, purifying the refrigerant and recharging, as well as evacuation and oil injection may be automatically controlled, or the operator may desire that each sequence of operation be manually initiated. For instance, if the refrigeration circuit requires servicing after the refrigerant has been evacuated therefrom substantial time may occur between evacuation and recharging, and the refrigerant will be stored within the purifier 120 and reservoir 96. If the only servicing required is to evacuate, purify the refrigerant, and recharge the circuit, the duration of cycling will be relatively short. Further, by permitting simultaneous operation of the purifier recycling system, and the evacuation, for instance, total servicing time can be minimized without adversely affecting the time necessary for proper purification.

It is appreciated that various modifications to the inventive concepts may be apparent to those skilled in the art without departing from the spirit and scope of the invention.

We claim:

1. A refrigeration circuit refrigerant processing system comprising, in combination, a manifold conduit adapted to be connected to the refrigeration circuit to be serviced, a pump circuit communicating with said manifold conduit for drawing refrigerant therefrom, a pump within said pump circuit, a condenser within said pump circuit liquifying refrigerant passing therethrough, a reservoir receiving said liquified refrigerant from said condenser, refrigerant purifying means selectively communicating with said reservoir for receiving refrigerant therefrom, heating means heating said refrigerant purifying means controlling the temperature of purified refrigerant, control means controlling said heating means, and a metering gear pump selectively communicating with said purifying means and said manifold conduit transferring refrigerant from said purifying means to said manifold conduit.

2. In a refrigeration circuit refrigerant processing system as in claim 1, make-up refrigerant supply means selectively communicating with said metering gear pump for selectively supplying refrigerant thereto in the event sufficient refrigerant for recharging is not available from said purifying means.

3. In a refrigeration circuit refrigerant processing system as in claim 2, refrigerant volume sensing means defined within said purifying means, said sensing means controlling the addition of supply refrigerant to said metering gear pump.

4. In a refrigeration circuit refrigerant processing system as in claim 1, a vacuum pump selectively communicating with said manifold conduit.

5. In a refrigeration circuit refrigerant processing system as in claim 1, valve means interposed in said manifold conduit, and intermediate said reservoir, purifying means gear pump and manifold conduit, and atomatic control means operating said valve means.

6. A refrigeration circuit refrigerant processing system comprising, in combination, a manifold conduit adapted to be connected to the refrigeration circuit to be serviced, a filter communicating with said manifold conduit, an evaporator communicating with said filter, an oil separator communicating with said evaporator, a recovery compressor having an inlet in communication with said oil separator and an outlet in communication with a condenser, a reservoir in communication with said condenser, a metering gear pump in selective communication with said reservoir, refrigerant purifying means in selective communication with said metering pump, a subcooler communicating with said purifier means and selectively communicating with said metering pump, conduit means selectively establishing communication between said metering pump and manifold conduit, valve means interposed between said manifold conduit and filter, between said reservoir and metering pump and purifying means, beween said subcooler and metering pump, and between said metering pump and manifold conduit, and automatic control means controlling said valve means.

7. In a refrigeration circuit refrigerant processing system as in claim 6, metered oil injection means selectively communicating with said manifold conduit, said control means controlling operation of said oil injection means.

8. In a refrigeration circuit refrigerant processing system as in claim 6, refrigerant supply means selectively communicating with said metering pump through valve means, said control means controlling said supply means valve means.

9. In a refrigeration circuit refrigerant processing system as in claim 6, a vacuum pump selectively communicating with said manifold conduit through valve means, said control means controlling said vacuum pump and vacuum pump valve means.

10. In a refrigeration circuit refrigerant processing system as in claim 6, heating means heating said refrigerant purifying means controlling the temperature of the purified refrigerant, and control means controlling the temperature of said heating means.

* * * * *